(12) United States Patent
Sato

(10) Patent No.: US 11,723,084 B2
(45) Date of Patent: Aug. 8, 2023

(54) INFORMATION PROCESSING TERMINAL, METHOD OF CONTROLLING INFORMATION PROCESSING TERMINAL, AND NON-TRANSITORY COMPUTER-READABLE RECORDING MEDIUM THEREFOR

(71) Applicant: BROTHER KOGYO KABUSHIKI KAISHA, Nagoya (JP)

(72) Inventor: Hirokazu Sato, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 183 days.

(21) Appl. No.: 17/211,089

(22) Filed: Mar. 24, 2021

(65) Prior Publication Data
US 2021/0307087 A1 Sep. 30, 2021

(30) Foreign Application Priority Data
Mar. 31, 2020 (JP) .................................. 2020-062665

(51) Int. Cl.
*H04W 76/10* (2018.01)
*H04W 4/02* (2018.01)
*H04W 84/12* (2009.01)

(52) U.S. Cl.
CPC ........... *H04W 76/10* (2018.02); *H04W 4/025* (2013.01); *H04W 84/12* (2013.01)

(58) Field of Classification Search
CPC ...... H04W 4/025; H04W 76/10; H04W 84/12
See application file for complete search history.

(56) References Cited

U.S. PATENT DOCUMENTS

2009/0111485 A1\* 4/2009 Kitani ............... H04W 52/0245
455/574

FOREIGN PATENT DOCUMENTS

| JP | 2016-178412 A | 10/2016 |
| JP | 2016178412 A | \* 10/2016 |

\* cited by examiner

*Primary Examiner* — Elton Williams
(74) *Attorney, Agent, or Firm* — Scully, Scott, Murphy & Presser, P.C.

(57) ABSTRACT

An information processing terminal according the present disclosures is configured to, by executing a device setting app, obtain connection information used to a setup to connect to an access point and store the connection information in a storage. Then, the information processing terminal selects connection information satisfying a particular condition from among at least one piece of the connection information stored in the storage based on information which is obtained by the information processing terminal, connects to an electronic device according to an NFC communication method which has a narrow communication range than a communication range of an Wi-Fi method, and transmits the selected connection information to the electronic device. The electronic device is configured to complete the setup using the received connection information.

11 Claims, 11 Drawing Sheets

| No | CONNECTION INFORMATION | | POSITION INFORMATION | |
|---|---|---|---|---|
| | SSID | PASSWORD | LONGITUDE | LATITUDE |
| 1 | AP1 | a123 | ○○○ | ○○○ |
| 2 | AP2 | b456 | ××× | ××× |
| 3 | AP3 | c789 | △△△ | △△△ |

122

FIG. 4

INFORMATION PROCESSING TERMINAL, METHOD OF CONTROLLING INFORMATION PROCESSING TERMINAL, AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2020-062665 filed on Mar. 31, 2020. The entire subject matter of the application is incorporated herein by reference.

BACKGROUND

Technical Field

The present disclosures relate to an information processing terminal configured to be connected to a wireless network, a method of controlling information processing terminal and a non-transitory computer-readable recording medium storing a program therefor.

In recent years, there has been known a communication system that connects multiple electronic devices to a wireless network via an access point. In order to connect each of the electronic devices to the wireless network, each electronic device must be set up to connect to the access point of the wireless network using connection information thereof. As an example of such a setup technique, there is known a configuration in which an information processing terminal (i.e., a connection relaying device) obtains connection information from the access point (i.e., a first wireless terminal), transmits the connection information to an electronic device (i.e., a second wireless terminal) that is not connected to the access point, and the electronic device connects to the access point using the connection information.

SUMMARY

As mentioned above, the information processing terminal such as a mobile terminal is typically configured to obtain connection information and passes the connection information to an electronic device that is not connected to the access point, as in the technology disclosed in the patent, which simplifies the user's work to set up on the electronic device. However, the electronic device that has obtained the connection information is not necessarily within the communication range of the access point corresponding to the obtained connection information. This is a problem because if it is out of the communication range of the access point, the setup will fail, and the user will be confused.

According to aspects of the present disclosures, there is provided a non-transitory computer-readable recording medium for an information processing terminal having a controller, the recording medium containing computer-executable instructions which cause, when executed by the controller, the information processing terminal to perform an obtaining process of obtaining connection information to be used for a setup to connect to an access point of a wireless network according to a first communication method, a storing process of storing the connection information obtained in the obtaining process in a storage of the information processing terminal, a selecting process of selecting particular connection information which is a connection information of an access point satisfying a particular condition from at least one piece of the connection information stored in the storage, the particular connection information being selected based on information obtained by the information processing terminal when the selecting process is performed, a connecting process of connecting to an electronic device according to a second communication method which has a narrower communication range than a communication range of the first communication method, and a transmitting process of transmitting the particular connection information selected in the selecting process to the electronic device connected to in the connecting process. The electronic device is configured to complete the setup using the particular connection information transmitted by the information processing terminal in the transmitting process and received from the information processing terminal.

According to aspects of the present disclosures, there is provided an information processing terminal comprising a storage, and a controller. The controller being configured to perform an obtaining process of obtaining connection information to be used for a setup to connect to an access point of a wireless network according to a first communication method, a storing process of storing the connection information obtained in the obtaining process in a storage of the information processing terminal, a selecting process of selecting particular connection information which is a connection information of an access point satisfying a particular condition from at least one piece of the connection information stored in the storage, the particular connection information being selected based on information obtained by the information processing terminal when the selecting process is performed, a connecting process of connecting to an electronic device according to a second communication method which has a narrower communication range than a communication range of the first communication method, and a transmitting process of transmitting the particular connection information selected in the selecting process to the electronic device connected to in the connecting process. The electronic device is configured to complete the setup using the particular connection information transmitted by the information processing terminal in the transmitting process and received from the information processing terminal.

According to aspects of the present disclosures, there is provided a method of controlling an information processing terminal, comprising obtaining connection information to be used for a setup to connect to an access point of a wireless network according to a first communication method, storing the connection information obtained in the obtaining process in a storage of the information processing terminal, selecting particular connection information which is a connection information of an access point satisfying a particular condition from at least one piece of the connection information stored in a storage of the information processing terminal, the particular connection information being selected based on information obtained by the information processing terminal when the selecting is performed, connecting to an electronic device according to a second communication method which has a narrower communication range than a communication range the first communication method, and transmitting the particular connection information selected in the selecting to the electronic device connected to in the connecting process. The electronic device is configured to complete the setup using the particular connection information transmitted by the information processing terminal in the transmitting and received from the information processing terminal.

BRIEF DESCRIPTION OF THE DRAWINGS

FIG. 4 is an explanatory diagram showing an example of a connection information DB.

DETAILED DESCRIPTION OF THE EMBODIMENT

Hereinafter, an embodiment in which a program and an information processing terminal that executes the program are embodied will be described in detail with reference to the accompanying drawings. The present embodiment discloses an information processing terminal that performs processes for connecting an electronic device to a wireless network.

Figure 1:
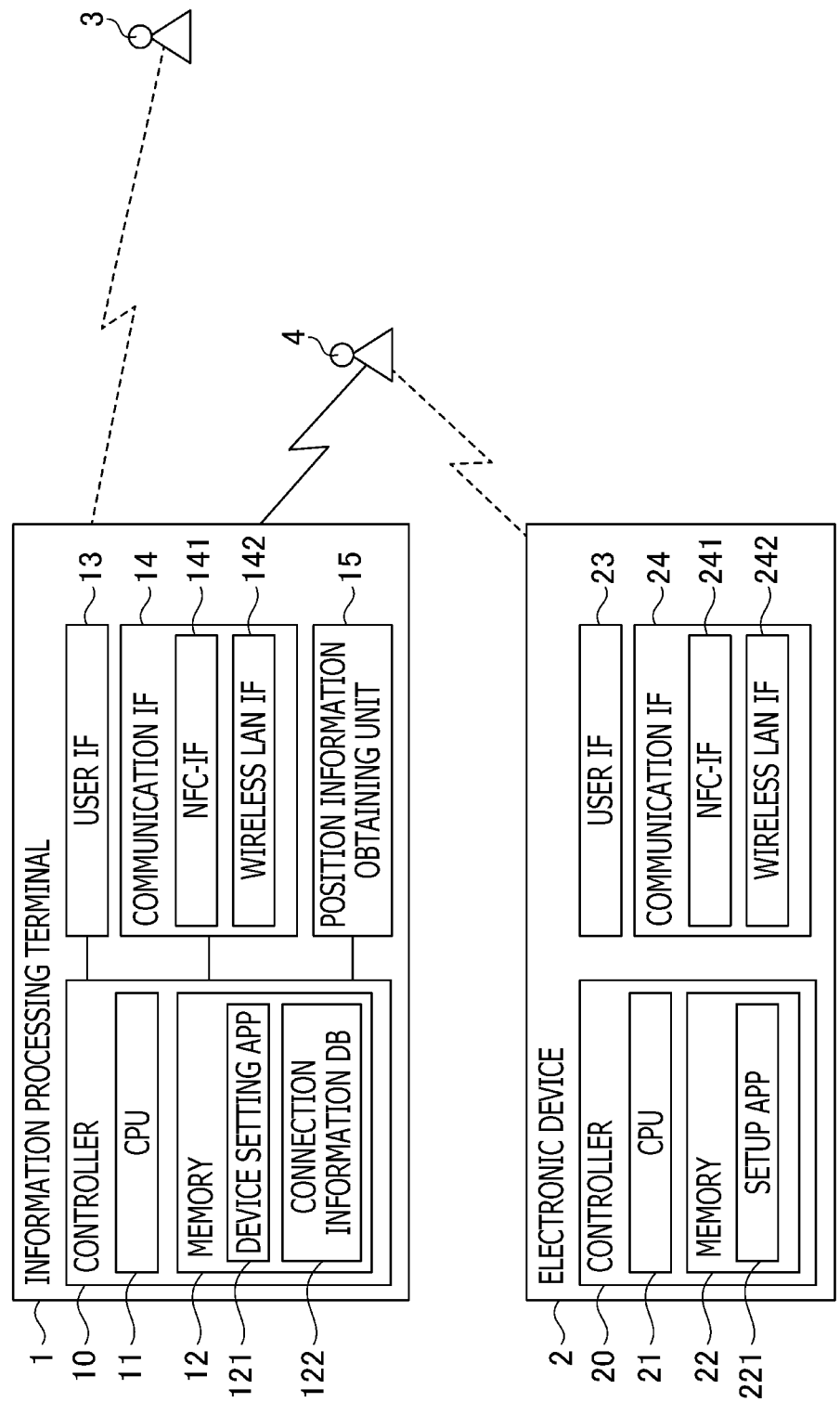
FIG. 1 is a schematic configuration diagram of an information processing terminal according to an embodiment of the present disclosures.

As shown in FIG. 1, the information processing terminal 1 includes a controller 10 provided with a CPU 11 and a memory 12. The information processing terminal 1 includes a user interface (hereinafter, referred to as a "user IF") 13, a communication interface (hereinafter, referred to as a "communication IF") 14, and a position information obtaining unit 15, which are electrically connected to the controller 10. The information processing terminal 1 is a portable device which is, for example, a smartphone or a tablet computer. It is noted that the controller 10 in FIG. 1 is a generic term for hardware and software used to control the information processing terminal 1, and does not necessarily represent a single piece of hardware actually present in the information processing terminal 1.

The CPU 11 executes various processes in accordance with programs read from the memory 12 and based on user operations. It is noted that the CPU 11 is an example of a computer. The memory 12 provides a storage area in which various programs, such as a startup program for starting the information processing terminal 1, various application programs (hereinafter referred to as "applications") and other programs, various data such as image data and document data, and various configuration information are stored. The memory 12 is also used as a work area when various processes are executed.

The user IF 13 is a touch panel, for example, and includes hardware configured to display a screen to inform the user of information and hardware configured to receive operations by the user. The user IF 13 may be a combination of a display and a keyboard, mouse, trackball, etc. It is noted that the user IF 13 is an example of a display device.

The communication IF 14 includes various hardware for communicating with external devices. The communication IF 14 includes, for example, an NFC (abbreviation for "Near Field Communication") interface (hereinafter, referred to as an "NFC-IF") 141, a wireless LAN interface (hereinafter, referred to as a "wireless LAN-IF") 142. An NFC-IF 141 is an interface that enables NFC wireless communication based on the international standards of ISO/IEC 21481 or ISO/IEC 18092. The wireless LAN-IF 142 is an interface that enables Wi-Fi® wireless communication based on the IEEE 802.11 standard and equivalent standards. Communication IF 14 may further include hardware for performing communication in accordance with other standards, e.g., Bluetooth® or a wired communication.

The position information obtaining unit 15 is configured to obtain information indicating a current geographic position using, for example, the Global Positioning System (hereafter, referred to as the "GPS"), and includes, for example, a GPS receiver and a GPS-based positioning function. The current geographic position is information, for example, a pair of latitude and longitude indicating the current position on the earth.

The memory 12 of the information processing terminal 1 according to the embodiment is configured to store a device setting app 121 and a connection information database (hereinafter, referred to as a "connection information DB") 122, as shown in FIG. 1. The device setting app 121 is a program that performs a process of connecting an electronic device to a wireless network. It is noted that the device setting app 121 is an example of a program. The connection information DB 122 is a database configured to store connection information used to set up a connection to the access point of the wireless network.

The access point is a communication device configured to connect various devices to a wireless network, such as the Internet or a LAN, in accordance with Wi-Fi wireless communication. Each access point has its own unique connection information. A device using an access point needs to complete the setup, which is the procedure of connecting to the access point, using the access point's connection information. It is noted that the Wi-Fi wireless communication using an access point is an example of a first communication method.

The connection information is, for example, a pair of identification information identifying the access point (hereinafter, referred to as an "SSID") and a pre-set password corresponding to the SSID. The device performing the setup sends the corresponding pre-set password to the access point specified by the SSID and completes the setup by obtaining the IP address issued by the access point. The connection information may be a single combination of the SSID and the password (i.e., the connection information of Wi-Fi Easy Connect). The password and combination information is an example of authentication information.

The information processing terminal 1 according to the present information has been set up to a plurality of access points, including an access point 3 and an access point 4, as shown in FIG. 1. The connection information DB 122 of the information processing terminal 1 is configured to store a plurality of pieces of connection information, including the connection information of the access point 3 and the connection information of the access point 4. The information processing terminal 1 is configured to obtain the connection information of the access point and stores the same in the connection information DB 122, for example, by executing the device setting app 121.

When there is an access point having been set up within a particular range where the Wi-Fi wireless communication is possible, the information processing terminal 1 is automatically connected to an access point having been set up. For example, as shown in FIG. 1, when the current position of the information processing terminal 1 is outside the particular range of the access point 3 and within the particular range of the access point 4, the communication IF 14 of the information processing terminal 1 is connected to the access point 4.

In addition, the information processing terminal 1 according to the present embodiment performs a device setup process by executing the device setting app 121 in which the connection information is transmitted to the electronic device to complete the setup of the electronic device. The electronic device 2 shown in FIG. 1 is the device subject to the device setup process by the information processing terminal 1 and is not connected to a wireless network before the device setup process is executed. The electronic device 2 is a device that has at least a wireless communication function, and examples of such a device include an MFP, a printer, a scanner, a facsimile device, a sewing machine, a camera, and the like.

The electronic device 2 has a controller 20 including a CPU 21 and a memory 22, as shown in FIG. 1. The electronic device 2 also has a user IF 23 and a communication IF 24, which are electrically connected to the controller 20. The user IF 23 is, for example, a touch panel and includes hardware configured to display a screen for notifying the user of information and hardware configured to receive operations by the user. The communication IF 24 includes, for example, an NFC-IF 241 and a wireless LAN-IF 242, and may also include hardware that performs configuration according to other communication standards, e.g., Bluetooth or wired communication. In addition to the configurations shown in FIG. 2, the electronic device 2 has configurations for realizing functions of the individual device. For example, when the device is a printer, it has a configuration for printing, and when the device is a scanner, it has a configuration for scanning an image.

While the electronic device 2 is powered on, the electronic device 2 becomes in a state of detecting an information processing terminal, that is capable of performing the NFC wireless communication, based on a signal periodically output by the NFC-IF 241. When, for example, the information processing terminal 1 with the NFC function being enabled becomes located within a particular distance from the NFC-IF 241, the electronic device 2 detects the information processing terminal 1 located close to the electronic device 2, thereby the NFC wireless communication between the information processing terminal 1 and the electronic device 2 being automatically enabled. The NFC method is different from the Wi-Fi method. The NFC method has a narrower communication range and slower communication speed than the Wi-Fi method. The wireless communication according to the NFC method is an example of a second communication method. Since the information processing terminal 1 is a portable device, the user can locate the NFC-IF 141 of the information processing terminal 1 at a position close to the NFC-IF 241 of the electronic device 2.

The electronic device 2 is further equipped with a wireless LAN access point function and is compliant with a Wi-Fi direct (hereinafter, referred to as "WFD") wireless communication. In other words, the electronic device 2 stores connection information according to the WFD method and has a function to become a group owner device that manages a network and configure a network in association with a client device. It is noted that the WFD method has, different from the NFC method, a wider communication range and higher communication speed than the NFC method.

Concretely, the electronic device 2 transmits the WFD connection information of the electronic device 2 itself in accordance with the NFC format when, for example, the wireless communication in the NFC format becomes possible. When receiving the WFD connection information according to the NFC method, the information processing terminal 1 becomes a client device by transmitting the received WFD connection information through the wireless LAN-IF 142, thereby communication with the electronic device 2 according to the WFD method being enabled.

A setup APP 221 is stored in the memory 22 of the electronic device 2. The setup APP 221 is a program that works in association with the device setting app 121 of the information processing terminal 1 to set up a connection to an access point using the connection information transmitted from the information processing terminal 1.

Figure 2:
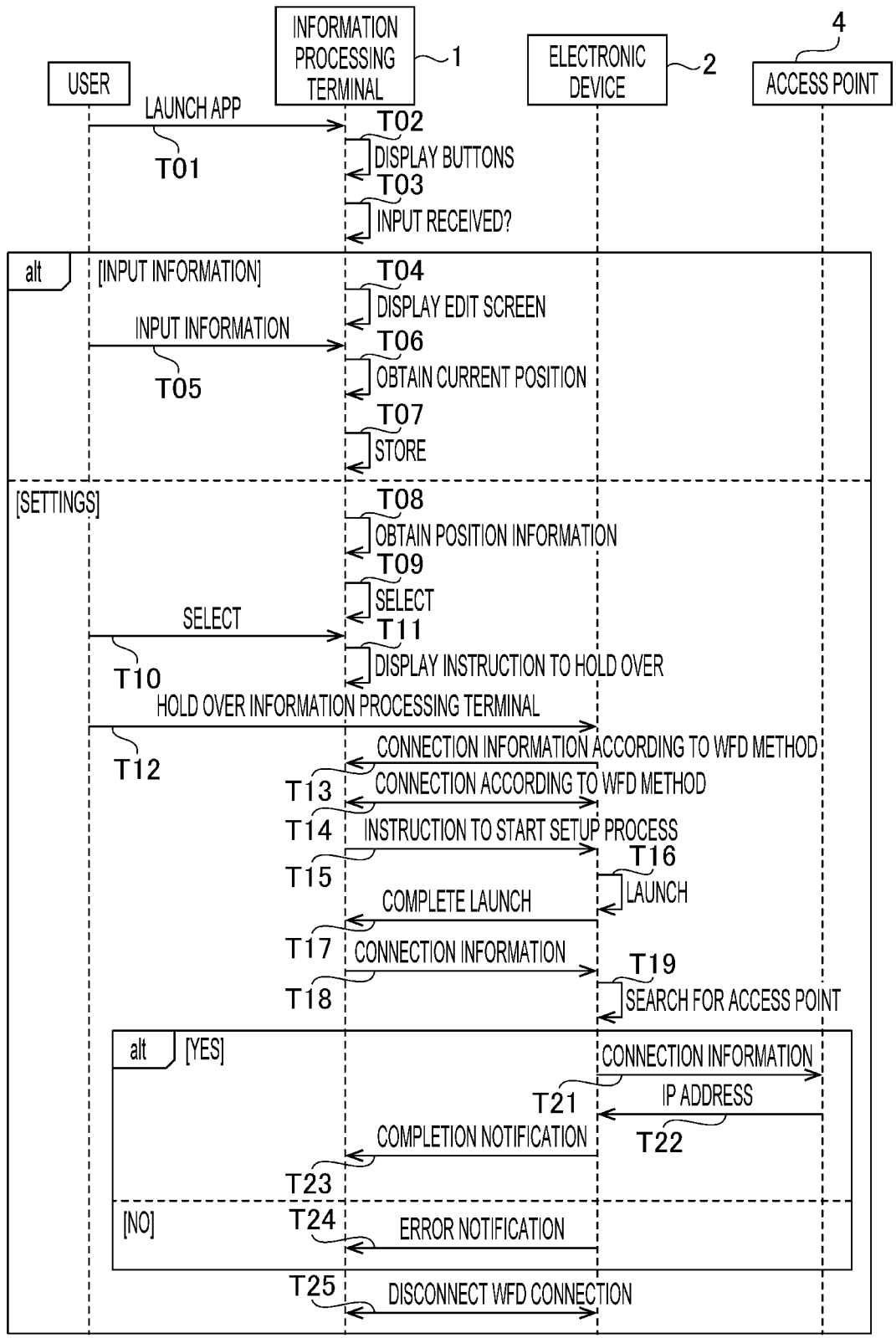
FIG. 2 is a sequence diagram showing an outline of a device setting process.

Next, a device setting process to complete a setup in the electronic device 2 using the device setting app 121 of the information processing terminal 1 according to the present embodiment will be described schematically with reference to a sequence diagram shown in FIG. 2. The processes shown in FIG. 2 are processes for connecting the electronic device 2 to the wireless network using the access point 4. It is noted that, In FIG. 2, processes of the information processing terminal 1 are performed by the CPU 11 and processes of the electronic device 2 are performed by the CPU 21.

Figure 3:
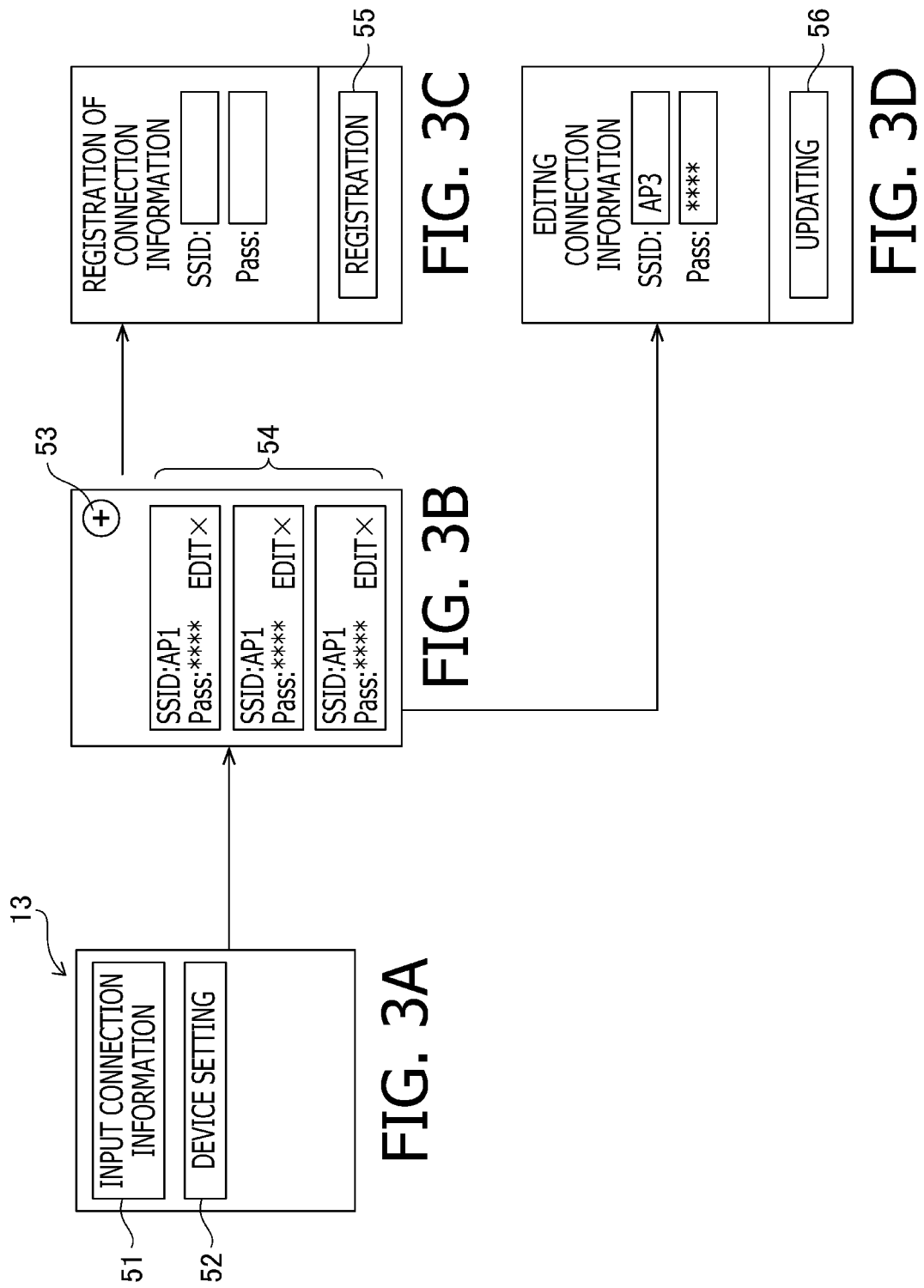
FIGS. 3A-3D are explanatory diagrams showing examples of a screen through which information is input.

When the device setting app 121 is launched by the user (T01), the information processing terminal 1 displays an instruction reception screen, including buttons used to receive the user's instructions, on the user IF 13 (T02). The device setting app 121 according to the present embodiment is configured to display, for example, a connection information input button 51 and a device setting button 52, as shown in FIG. 3A. The connection information input button 51 is a button used to receive instructions to add new connection information to the connection information DB 122, or to edit stored connection information. The device setting button 52 is a button used to receive instructions to select one of pieces of the information stored in the connection information DB 122 and set the same to the target electronic device.

The information processing terminal 1 then waits until input to one of the buttons is received (T03). When the received instruction corresponds to the connection information input button 51 (i.e., [Information Input]), the information processing terminal 1 displays an edit screen for the connection information on the user IF 13 (T04). The information processing terminal 1 displays a screen including, for example, an addition button 53 used to receive instructions for adding connection information and a plurality of edit buttons 54 used to receive instructions for editing each piece of stored connection information, as shown in FIG. 3B.

When an operation to the addition button 53 is received, the information processing terminal 1 displays, for example, an SSID input field and a password input field, and a registration button 55, as shown in FIG. 3C, to receive the input. When the operation to the edit button 54 is received, the information processing terminal 1 displays, for example, fields displaying the SSID and the password and enabling the user to edit the same, and an update button 56, as shown in FIG. 3D.

When receiving an instruction to input the connection information currently displayed as the user operates the registration button 55 or the update button 56 (T05), the information processing terminal 1 obtains information indicating the current position at that time using the position information obtaining unit 15 (T06). Further, the information processing terminal 1 stores the connection information of which the input instruction is received at T05 and the position information obtained at T06 in the connection information DB 122 of the memory 12 in an associated manner (T07).

An example of the connection information DB 122 is shown in FIG. 4. The connection information DB 122 in this example stores information of a pair of the SSID and the password as the connection information, and information of a pair of the latitude and the longitude as the position information, in an associated manner. The connection information is information received at T05 and the position information is information obtained at T06. The user who inputs the connection information is likely to be close to the access point since he or she is checking the connection information indicated on the access point or described in a manual of the access point while entering the information. In other words, the position information stored in the connection information DB 122 is likely to be information indicating a position close to the geographic position of the access point indicated by the corresponding connection information.

Figure 5:
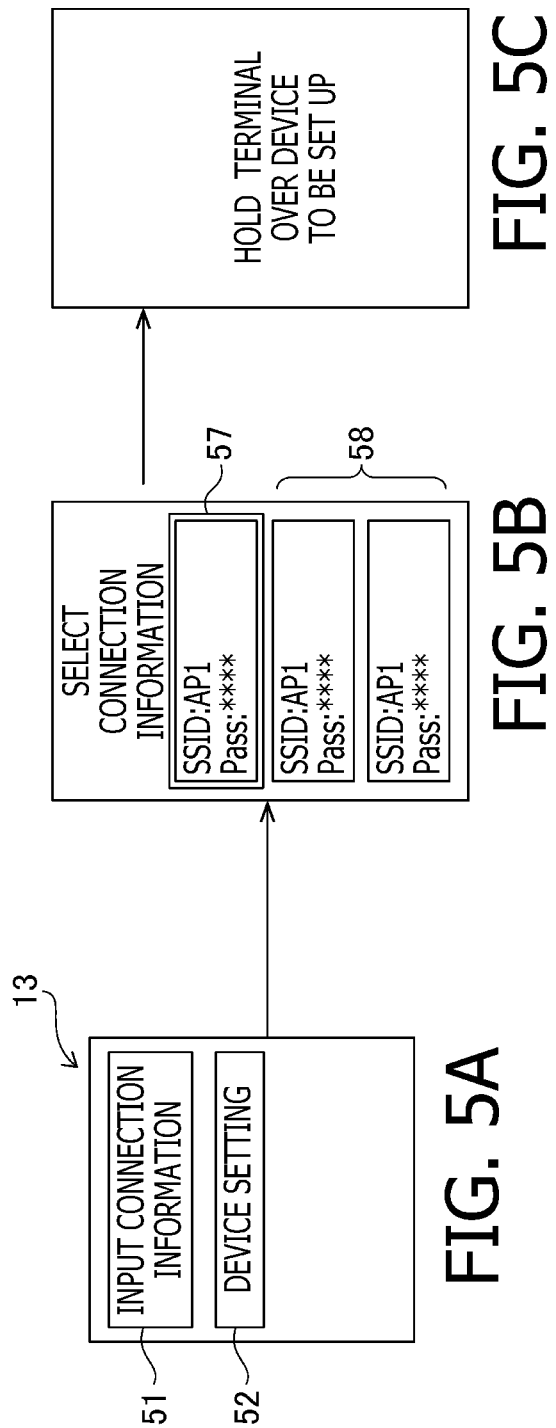
FIGS. 5A, 5B and 5C are explanatory diagrams showing examples of a screen for receiving device settings.

On the other hand, when an input to the device setting button 52 is performed (i.e., [Settings]) on the screen shown in FIG. 5A, the information processing terminal 1 obtains the position information of the information processing terminal 1 itself (T08), and based on the obtained information, selects the connection information satisfying particular conditions from the connection information DB 122 stored in the memory 12 as the connection information to be set up to the electronic device 2 (T09). The information processing terminal 1 displays, in a list, each connection information stored in the connection information DB 122 and receives the user's selection (T10), for example, as shown in FIG. 5B. Details of processes at T08 and T09 will be described below. It is noted that the screen shown in FIG. 5A is the same as the screen shown in FIG. 3A. Therefore, if an input is performed on the screen shown in FIG. 3A, the screen shown in FIG. 3B or the screen shown in FIG. 5B is displayed.

Once the connection information is selected, the information processing terminal 1 activates the NFC function of the information processing terminal 1 itself, and displays a message, on the user IF 13, instructing the user IF 13 to hold the information processing terminal 1 over the electronic device 2 to be set up, for example, as shown in FIG. 5C (T11). When the information processing terminal 1 is held over the electronic device 2 by the user (T12), the information processing terminal 1 receives the WFD connection information from the electronic device 2 via the NFC-IF 141 (T13) and requests the electronic device 2 to connect according to the WFD method. This enables the wireless communication according to the WFD method between the information processing terminal 1 and the electronic device 2 (T14).

The information processing terminal 1 transmits instructions to the electronic device 2, according to the WFD method, to launch the setup APP 221 and start the setup process (T15). The electronic device 2 launches the setup APP 221 (T16) and transmits information indicating that the launch has been completed to the information processing terminal 1 (T17). After receiving the information indicating the completion of the startup, the information processing terminal 1 transmits the connection information selected at T09 to the electronic device 2 (T18). The electronic device 2 receives the connection information from the information processing terminal 1 at TIS.

The electronic device 2 uses the SSID contained in the received connection information to search for a corresponding access point (T19). When the corresponding access point is retrieved (i.e., [Yes]), the electronic device 2 transmits the password contained in the connection information to the access point (T21). When the selected connection information is the connection information of the access point 4, the electronic device 2 transmits the connection information to the access point 4.

Figure 6:
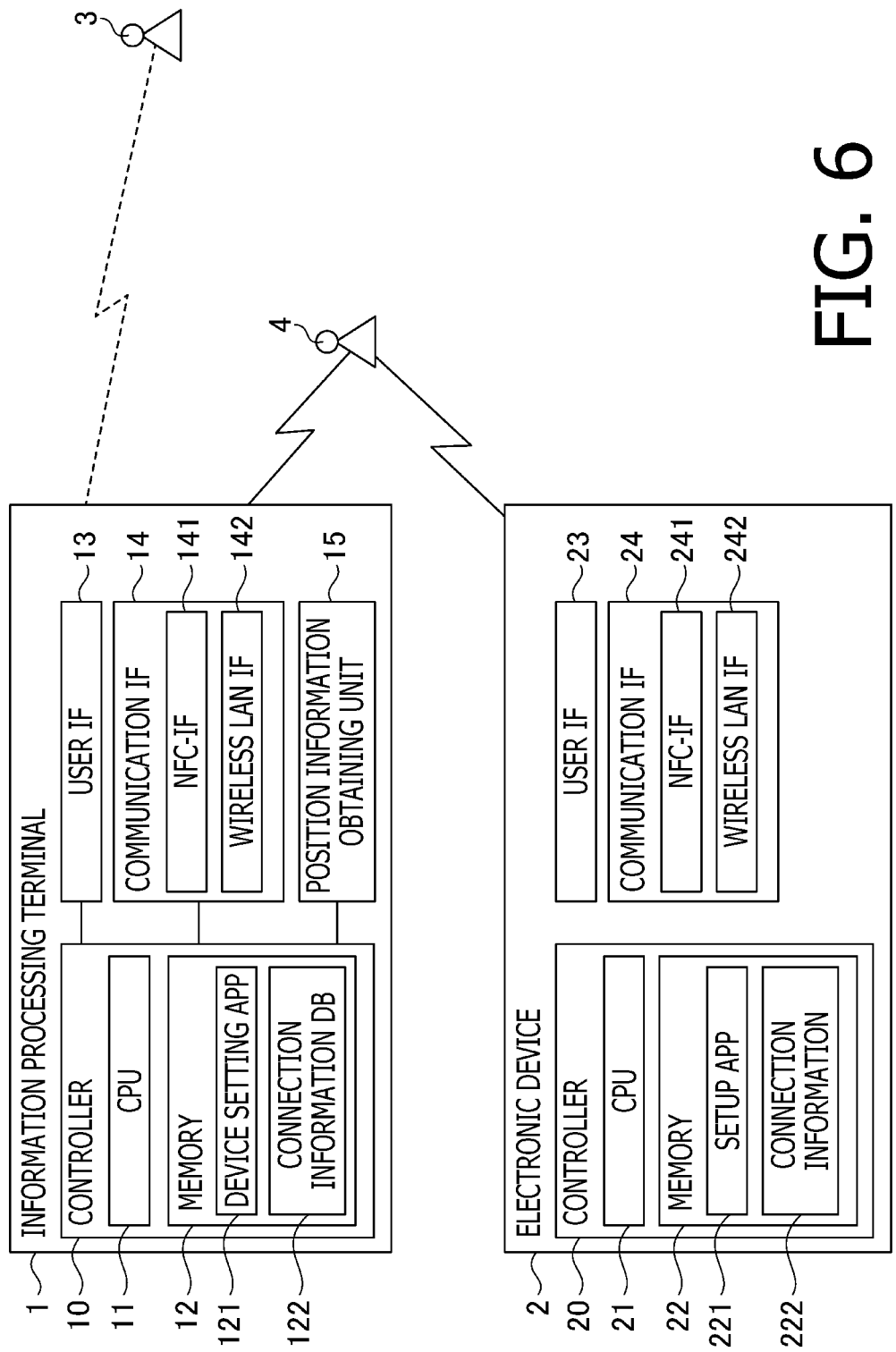
FIG. 6 is a schematic configuration diagram showing an electronic device having been set.

When the access point 4 receives the appropriate connection information, the access point 4 assigns an IP address to the electronic device 2 that transmitted the connection information, and transmits the assigned IP address to the electronic device 2 (T22). The electronic device 2 transmits a completion notification to the information processing terminal 1 (T23) since the setup to connect to the wireless network using the access point 4 is complete upon receipt of the IP address. This causes the connection information 222 of the access point 4 to be stored in the memory 22 of the electronic device 2, as shown in FIG. 6, and the electronic device 2 and the access point 4 can be connected.

On the other hand, when the access point corresponding to the connection information received at T18 is not retrieved (i.e., [No]), the electronic device 2 cannot complete the setup, and transmits an error notification to the information processing terminal 1 (T24) since the setup cannot be completed. Further, when the connection information is transmitted to the access point 4, but the electronic device 2 receives error information from the access point 4 instead of an IP address, the electronic device 2 also sends an error notification to the information processing terminal 1.

The information processing terminal 1 disconnects the WFD connection (T25) after T23 or T24. When receiving the completion notification, the information processing terminal 1 may connect to the electronic device 2 according to the Wi-Fi method. When receiving the error notification, the information processing terminal 1 may re-display the selection screen to receive the selection of another connection information.

Figure 7A:
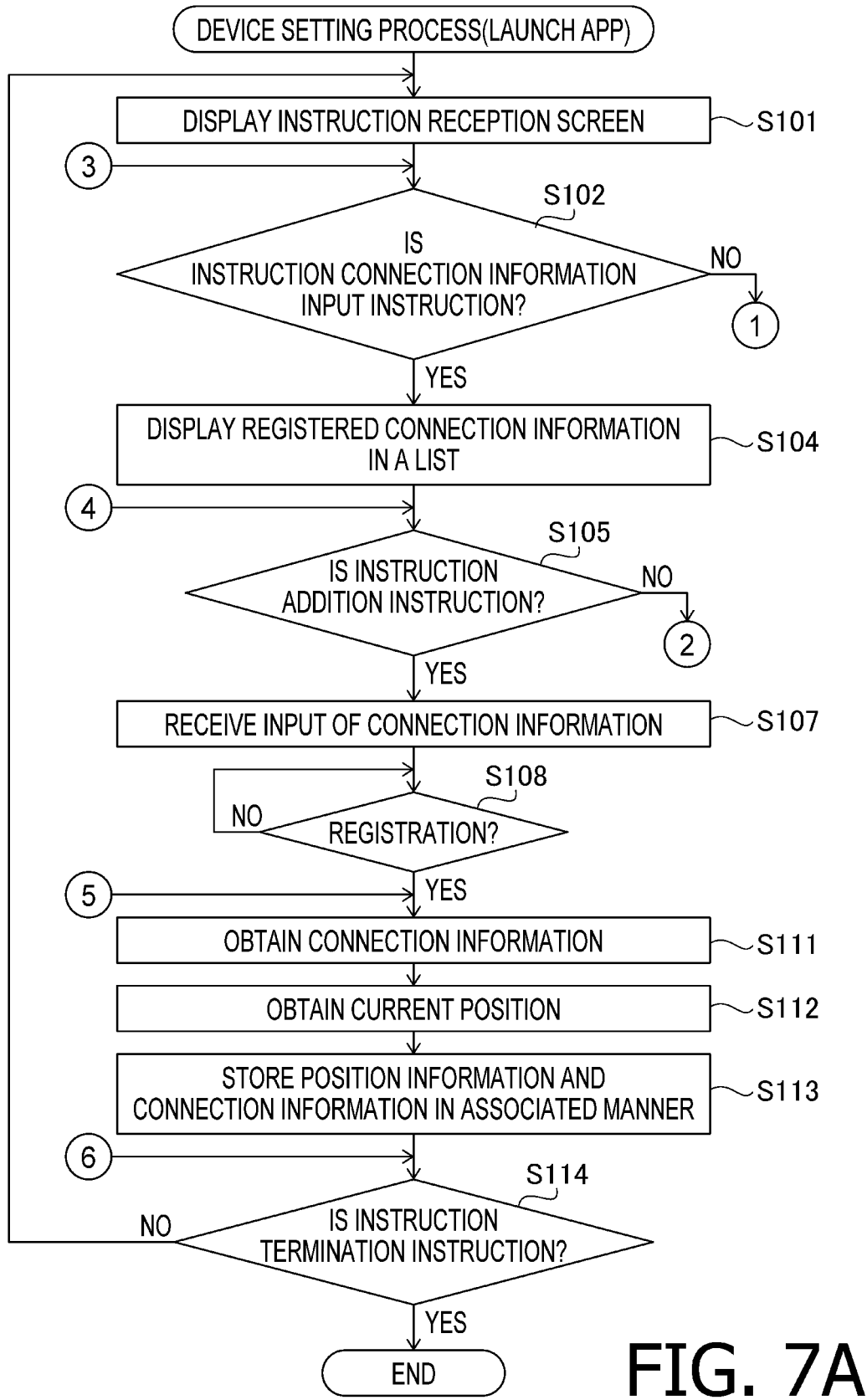
FIGS. 7A and 7B show a flowchart illustrating a device setting process.
Figure 7B:
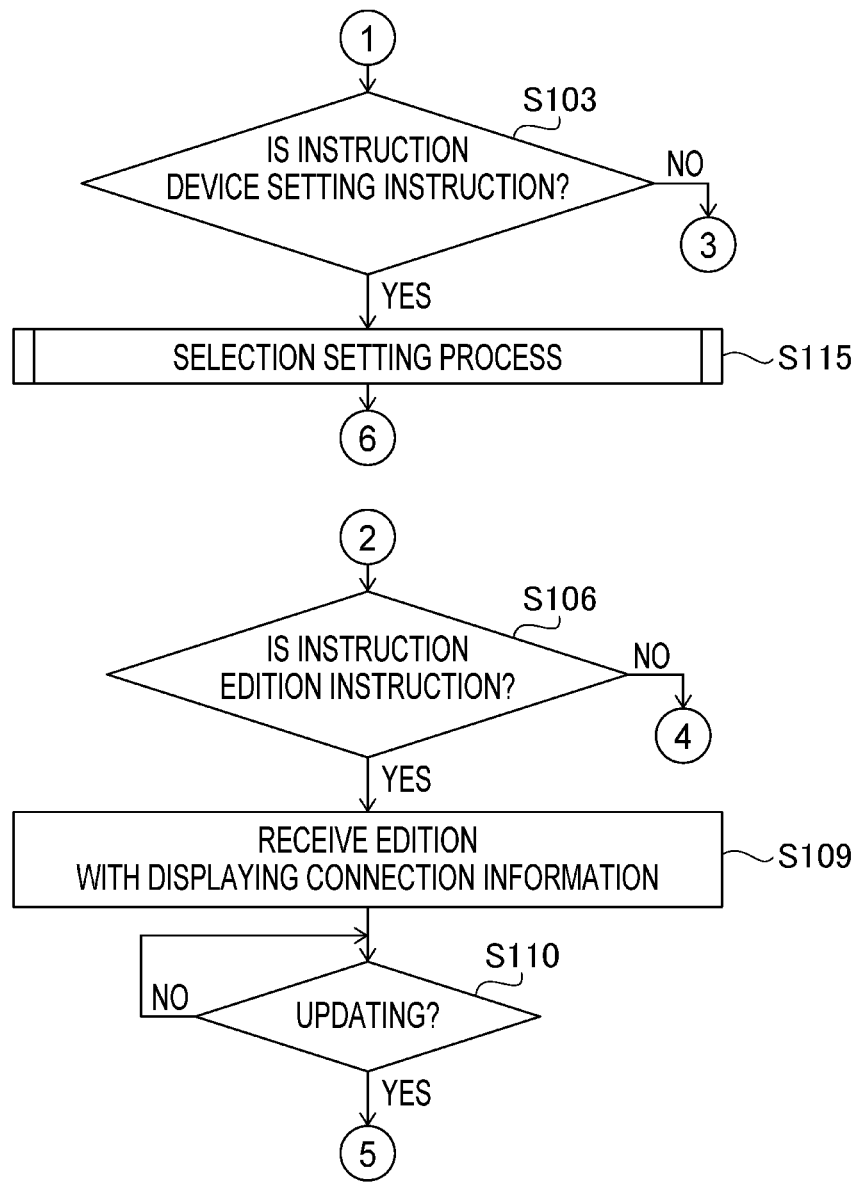

Next, the device setting process performed by the information processing terminal 1 to cause the electronic device 2 to complete the setup will be described with reference to a flowchart shown in FIGS. 7A and 7B. The device setting process is executed by the CPU 11 of the information processing terminal 1 in response to the device setting app 121 being launched in the information processing terminal 1. It is noted that the device setting app 121 may be a part of an application that causes the MFP to perform printing or scanning. That is, the device setting process may be triggered in response to receipt of a device setting instruction while another app is being executed.

In the device setting process, the CPU 11 first causes the user IF 13 to display the instruction reception screen (T02, S101). The instruction reception screen includes the connection information input button 51 and the device setting button 52, as shown in FIG. 3A, and is configured to receive either instruction through the button 51 or 52. The CPU 11 determines whether the connection information input instruction is received as the connection information input button 51 is operated (T03, S102). When it is determined that the connection information input instruction is not received (S102: NO), the CPU 11 determines whether the device setting instruction is received as the device setting button 52 is operated (S103). When it determines that the device setting instruction is not received (S103: NO), the CPU 11 waits until either one of the instructions is received.

When it is determined that the instruction to input the connection information is received (i.e., [Information Input], S102: YES), the CPU 11 retrieves the registered connection information from the connection information DB 122 and displays a list on the edit screen of the user IF 13 (T04, S104), as shown in FIG. 3B. Further, the CPU 11 receives an operation of the addition button 53 or the edit button 54. The CPU 11 then determines whether or not an addition instruction is received as the addition button 53 is operated (S105). When it is determined that the addition instruction is not received (S105: NO), the CPU 11 determines whether or not an instruction to edit is received as the edit button 54 is operated (S106). When it is determined that no instruction to edit is received (S106: NO), the CPU 11 waits until one of the instructions is received.

When determining that the addition instruction has been received (S105: YES), the CPU 11 displays an input field on the user IF 13 to receive the user input of connection information, as shown in FIG. 3C, and receives the input by the user (S107). In addition, the CPU 11 determines whether or not the registration instruction is received as the registration button 55 is operated (S108). When it is determined that the registration instruction is not received (S108: NO), the CPU 11 waits until the registration instruction is received. It is noted that the operation of the registration button 55 may not be accepted when no information has been entered in the input field. There may also be provided an operation button to cancel the registration and return to the previous screen.

When it is determined that an instruction to edit one piece of the registered connection information is received (S106: YES), the CPU 11 displays the designated connection information on the user IF 13, as shown in FIG. 3D, and accepts edition by the user (S109). It is noted that the CPU 11 may be configured to receive, in addition to the instruction to edit, an instruction to delete the registration. Further, the CPU 11 determines whether or not an instruction to update is received as the update button 56 is operated (S110), and when it is determined that the updating instruction is not received (S110: NO), the CPU 11 waits until the CPU 11 receives the updating instruction. There may also be a button to receive instructions to cancel the edit and return to the previous screen.

When it determines that the registration instruction is received (S108: YES) or the updating instruction is received (S110: YES), the CPU 11 obtains the information that was displayed when the registration instruction or the updating instruction was received as the connection information (T05, S111). It is noted that a process in S111 is an example of the obtaining process.

Then, the CPU 11 obtains information about the current position using the position information obtaining unit 15 (T06, S112). The position information obtained in S112 is an example of the first position information. The CPU 11 obtains, for example, the latitude and longitude information with use of the GPS function as information about the current position. Further, the CPU 11 associates the position information obtained in S112 with the connection information obtained in S111 and stores the same in the connection information DB 122 (T07, S113). The process in S113 is an example of a storing process. When receiving the instruction to register new information, the CPU 11 stores the new connection information in the connection information DB 122 in association with the position information. When receiving the instruction to update the registered information, the CPU 11 updates the information stored in the connection information DB 122.

When a version of the device setting app 121 is upgraded, the information processing terminal 1 inherits and uses the connection information DB 122 in which the information is stored by the old version of the device setting app 121. When the information processing terminal 1 obtains the connection information for the access point with use of a program other than the device setting app 121, the information processing terminal 1 may also store the connection information in the connection information DB 122. The information processing terminal 1 can also use the connection information entered by the old version of the program or other programs, which increases the convenience of the device setting app 121. Further, when connection information without the position information being added, such as the connection information entered by other programs, is stored in the connection information DB 122, the information processing terminal 1 may be configured to receive instructions to enter only position information.

The CPU 11 then determines whether the instruction to terminate the app is received or not (S114). When it is determined that the instruction to terminate the APP has not been received (S114: NO), the CPU 11 returns to S101 and further receives instructions to input the connection information or set up the device.

On the other hand, when the CPU 11 determines that the device setting instruction is received on the instruction reception screen ([setting], S103: YES), the CPU 11 performs the selection setting process (S115). The selection setting process is a process of selecting one piece of the registered connection information, transmitting the same to the electronic device 2 and completing the setup of the electronic device 2.

Figure 8A:
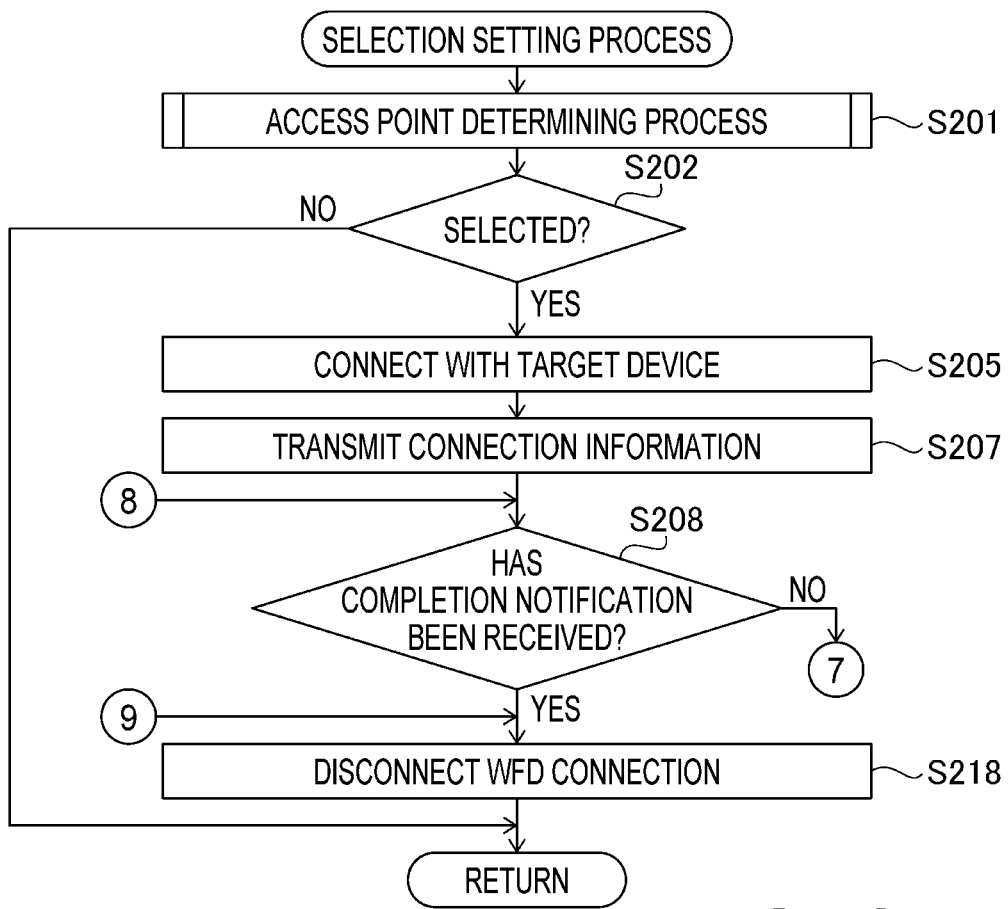
FIGS. 8A and 8B show a flowchart illustrating a selection setting process.
Figure 8B:
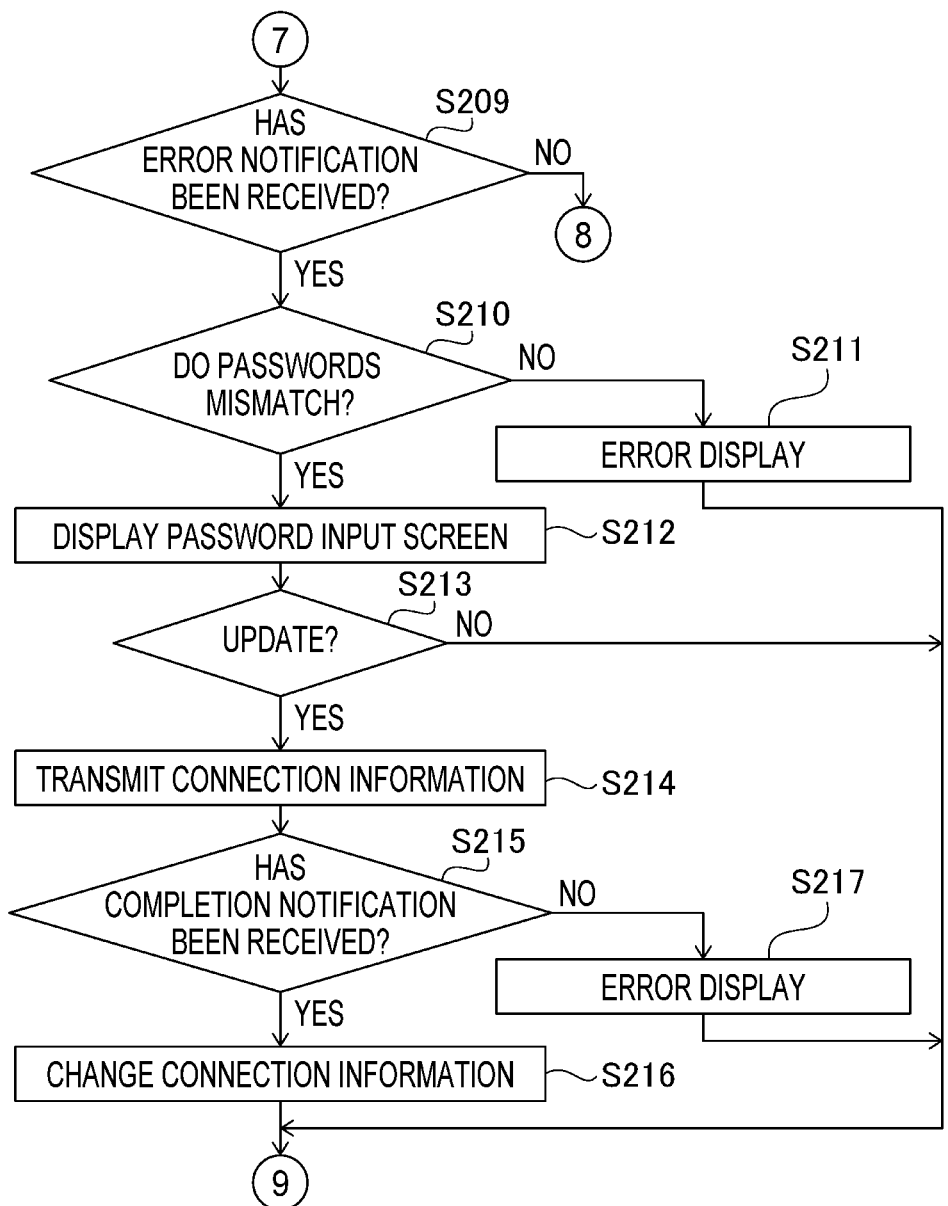

The selection setting process is described with reference to the flowchart in FIGS. 8A and 8B. In the selection setting process, the CPU 11 first performs an access point determining process (S201). The access point determining process is a process of determining an access point of connection information to be provided to the electronic device 2 from among the connection information registered in the connection information DB 122.

Figure 9:
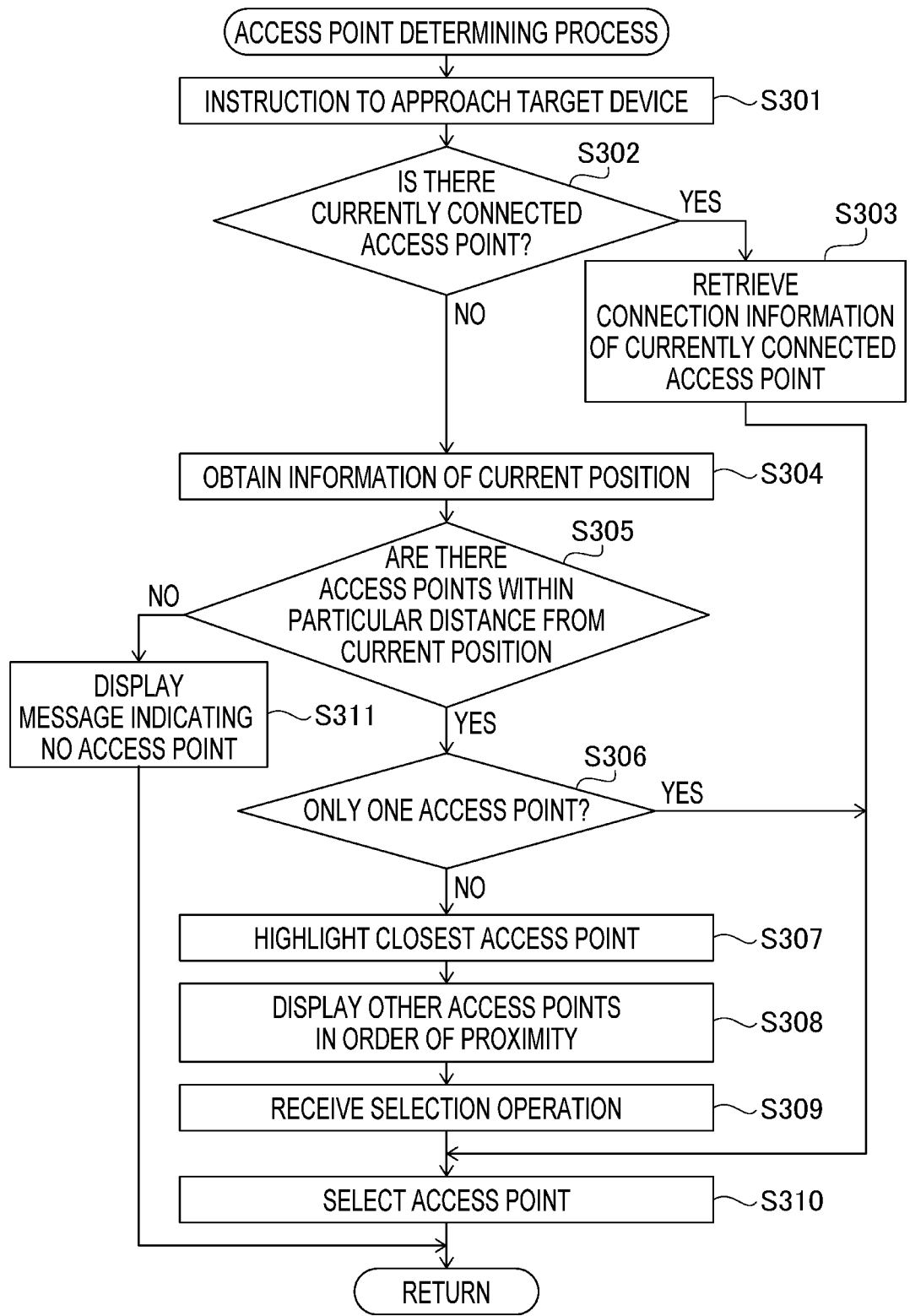
FIG. 9 is a flowchart illustrating an access point determining process.

The access point determining process is described with reference to the flowchart in FIG. 9. In FIG. 9, the access point is abbreviated to "AP." In the access point determining process, the CPU 11 displays a message on the user IF 13 prompting the user to approach the electronic device 2 to be set up (S301). The CPU 11 encourages the user to move to a position to reach the NFC-IF 241 by notifying a necessity to communicate with the electronic device 2 according to the NFC communication. Further, the CPU 11 may receive a user input indicating that the user has moved to the position to reach the NFC-IF 241 when the user has reached the position.

The CPU 11 determines whether there is an access point to which the information processing terminal 1 itself is connected while the information processing terminal 1 is in the vicinity of the electronic device 2 to be set up (T08, S302). As mentioned above, the information processing terminal 1 is automatically connected if it can communicate wirelessly with the access point that has been set up, and the CPU 11 can obtain information about the SSID of the currently connected access point from the operating system.

When it is determined that there is an access point to which the information processing terminal 1 is connected (S302: YES), the CPU 11 selects connection information including the password corresponding to the SSID of the connected access point as the connection information to be set in the electronic device 2 (T09), and retrieves the selected connection information from the connection information DB 122 (S303). It is noted that the process in S303 is an example of a selection process. As mentioned above, the connection information DB 122 also stores connection information entered by older versions of the program and/or other programs, and the CPU 11 selects the connection information from among these pieces of connection information.

If there is an access point to which the information processing terminal 1 is being connected, the information processing terminal 1 is likely to be located within a particular distance from that access point, and the electronic device 2 is likely to be within the particular distance from that access point. The particular range may be less than or equal to the maximum distance within which the Wi-Fi wireless communication is possible, and may be a particular fixed value or a variable value based on user input. The information indicating whether the information processing terminal 1 itself is connected or not is an example of information obtained at the current position, and the access point to which the information processing terminal 1 itself is connected is an example of an access point satisfying the particular conditions. The connection information retrieved at S303 is an example of particular connection information.

On the other hand, when it determines that there is no access point to which the information processing terminal 1 is being connected (S302: NO), the CPU 11 uses the position information obtaining unit 15 to obtain information on latitude and longitude as information on the current position (T08, S304), which is the same process as S112 in the device setting process. The position information to be obtained in S304 is an example of the information to be obtained at the current position and is an example of the second position information.

The CPU 11 then extracts, from the connection information DB 122, the connection information of the access point located within the particular range of distance from the current position based on the obtained position information and the position information associated with the registered connection information which is stored in the connection information DB 122 of the memory 12. As mentioned above, the connection information DB 122 also stores connection information entered by previous versions of the program and/or other programs, and the CPU 11 extracts the connection information from these pieces of the connection information. The CPU 11 then determines whether the extracted access point is present, i.e., whether there exists an access point within the particular distance from the current position (S305).

Since the connection information is associated with the information indicating the position of the information processing terminal 1 at the time of registration, the CPU 11 can determine whether the distance between the position at the time the connection information was registered and the current position is within the particular range, based on the position information of the current position obtained in S304. Since the connection information of an access point near the information processing terminal 1 can be obtained based on the position information, the possibility that the electronic device 2 that received the connection information can connect to the access point is increased. An access point of which the distance between the position thereof at the time of registration and the current position is within the particular range is an example of an access point that meets the particular condition.

When it is determined that there exists an access point at a position within the particular range (S305: YES), the CPU 11 determines whether there was only one access point within the particular range (S306). When it is determined that there are more than one access point within the particular range (S306: NO), the CPU 11 displays the connection information of the access point within the particular range that has the closest distance to the current position on the user IF 13 in a highlighted manner (S307). Further, the CPU 11 displays a list of the remaining extracted access points on the user IF 13 such that the closer the position represented by the connection information from the current position is, the higher the priority is (S308). Furthermore, the CPU 11 accepts a user selection operation of one of the listed pieces of the connection information (S309).

The CPU 11, for example, causes the connection information 57 of the nearest access point to be highlighted differently from the other connection information 58, as shown in FIG. 5B, and causes the other connection information 58 to be displayed from the top in ascending order of distance. Examples of highlighting include, for example, displaying the connection information at the beginning or at the top of the list, displaying the same in a different font (e.g., bold, italic, large size, color inversion) from the others, or decorating the same with underlines, character enclosures, shading, etc. It is noted that, in the list view, it is possible to display only the SSID and not the password.

By displaying a plurality of pieces of the connection information associated with position information closer to the current position of the information processing terminal 1 on a priority basis, the connection information associated with position information close to the electronic device 2 is more likely to be selected if the electronic device 2 is closer to the information processing terminal 1, and thus the possibility that the electronic device 2 can be connected to the access point is increased. It is only necessary that the connection information representing the closer positions may be displayed on a priority basis. Therefore, instead of displaying a list of the connection information, only the connection information of the nearest access point may be displayed first, and other connection information may be displayed when the user's instruction therefor is received.

After execution of S303 or S309, or when it is determined that there was only one extracted access point (S306: YES), the CPU 11 selects that connection information as the information of the access point to be set up in the electronic device 2 (T09, S310). That is, the CPU 11 selects the connection information retrieved at S303, the only one piece of connection information extracted in S305, or the connection information selected in S309, as the particular connection information to be set up in the electronic device 2. It is noted that the process of S310 is an example of a selection process.

On the other hand, when it is determined that there is no access point within the particular range from the current position (S305: NO), the CPU 11 displays a message indicating that there is no access point nearby on the user IF 13 (S311). It is noted that the process in S311 is an example of a notification process. By notifying the user that there is no access point nearby, the user can know that the setup may fail, reducing the possibility of the user being confused even if the setup fails. After execution of S310 or S311, the CPU 11 terminates the access point determining process and returns to the selection setting process.

Returning to the explanation of the selection setting process in FIG. 8, after performing the access point determining process in S201 of the selection setting process, the CPU 11 determines whether the connection information has been selected in the access point determining process (S202). When a message is displayed in S311 of the access point determining process, the access point has not been determined and the connection information has not been selected. When it is determined that no connection information has been selected (S202: NO), the CPU 11 terminates the selection setting process and returns to the device setting process.

On the other hand, when it is determined that the connection information has been selected (S202: YES), the CPU 11 causes the electronic device 2 to complete the setup using the selected connection information. In order to do so, the CPU 11 initiates the WFD communication with the electronic device 2 according to the NFC method and causes the electronic device 2 to launch the setup APP 221 (T11 to T17, S205), as described above. The process of connecting with the electronic device 2 according to the NFC method in S205 is an example of a connection process.

Further, the CPU 11 transmits the connection information determined in the access point determining process, which is subjected to transmission, to the electronic device 2 according to the WFD method (S207). The process in S207 is an example of a transmission process. In S207, the CPU 11 transmits a command instructing to perform the setup, together with the connection information, to the electronic device 2.

Thereby, as described above, the electronic device 2 searches for an access point that corresponds to the received connection information and transmits the connection information to that access point, e.g., the access point 4 (T19-T21). If the connection information is appropriate, the electronic device 2 receives the IP address information from the access point 4 and transmits a completion notification to the information processing terminal 1 (T22 to T23). On the other hand, if the information of the IP address cannot be received from the access point 4, the electronic device 2 transmits an error notification to the information processing terminal 1 (T24).

The CPU 11 determines whether the completion notification is received from the electronic device 2 (S208). When it is determined that the completion notification has not been received (S208: NO), the CPU 11 determines whether the error notification has been received (S209). When it is determined that the error notification has not been received (S209: NO), the CPU 11 waits until the completion notification or the error notification is received.

When it is determined that the error notification has been received (T24, S209: YES), the CPU 11 determines whether the error is a password mismatch (S210). When it is determined that the error is not the password mismatch (S210: NO), the CPU 11 displays a message on the user IF 13 indicating that an error has occurred (S211).

When it is determined that the error is the password mismatch (S210: YES), the CPU 11 displays a password input screen on the user IF 13 (S212) and accepts the user's input of the password. The password input screen is, for example, a screen as shown in FIG. 3D, and the CPU 11 receives an updating instruction for updating the password. The CPU 11 then determines whether the updating instruction by the user is received or not (S213).

When it is determined that the CPU 11 has received the updating instruction (S213: YES), the CPU 11 transmits the updated connection information to the electronic device 2 again (S214). It is noted that the process in S214 is an example of a retransmission process. The CPU 11 then determines whether or not a completion notification is received from the electronic device 2 (S215). When it is determined that the completion notification is received (S215: YES), the CPU 11 changes (i.e., updates) the connection information DB 122 by storing the updated connection information in the connection information DB 122 (S216). It is noted that the process in S216 is an example of a changing process.

If the password for the connection information stored in the past is incorrect, or if the password set for the access point has been changed, the electronic device 2 will not be able to complete the setup. In this embodiment, upon receipt of the error notification, the CPU 11 accepts a new password so that the appropriate connection information can be obtained, thereby increasing the possibility of completing the setup. Further, when the setup is successful with the newly entered password, the password is stored in the connection information DB 122. Therefore, when sending the connection information to another electronic device, the possibility the setup will be successful on that other electronic device 2.

When it is determined that the completion notification has not been received, but the error notification has been received again (S215: NO), the CPU 11 displays the error notification on the user IF 13 (S217). It is noted that the CPU 11 may be configured to receive the user input again.

When it is determined that the CPU 11 has received the completion notification in response to the initial connection information (T23, S208: YES), the CPU 11 has received instructions not to update (S213: NO), or after execution of S211, S216 or S217, the CPU 11 disconnects the WFD connection with the electronic device 2 (T25, S218), terminates the selection setting process, and returns to the device setting process.

Returning to the device setting process shown in FIG. 7, the CPU 11 determines whether or not a termination instruction is received after the completion of the selection setting process in S115 (S114). When it is determined that the CPU 11 has not received the termination instruction (S114: NO), the CPU 11 returns to S101 and further receives instructions to input the connection information or the setup of the device. When it is determined that the termination instruction is received (S114: YES), the CPU 11 terminates the device setting process and terminates the device setting APP 121.

As described in detail above, according to the information processing terminal 1 of the present embodiment, by connecting to the electronic device 2 which is the target caused to perform setup for connecting to an access point of a wireless network according to the Wi-Fi method with use of the NFC method, which has a narrower communication range than the Wi-Fi method, it is ensured that the electronic device 2 is near the information processing terminal 1. Further, the information processing terminal 1 selects the connection information of the access point that meets the particular conditions based on the information of the current position of the information processing terminal 1 from the connection information DB 122 stored in advance, and transmits the connection information to the electronic device 2. As a result, the connection information of the access point near the electronic device 2 is transmitted to the electronic device 2. Accordingly, the possibility that the electronic device 2 is within the communication range of the access point is increased, thereby the possibility of setup failure being reduced.

It is noted that the embodiment described above is merely an illustrative example and is not intended to limit the aspects of the present disclosures in any way. The configuration of the above-described embodiment can naturally be improved and/or modified in various ways within aspects of the present disclosures. For example, there may exist multiple electronic devices to be configured. That is, when there is a plurality of electronic devices located in a neighborhood, the information processing terminal 1 may transmit the same connection information to each of the plurality of electronic devices.

It is noted that the method of entering the connection information does not need to be limited to obtaining both the SSID and the password by user input. For example, the information processing terminal 1 may be configured to retrieve and display the SSID of an access point that is already set up by the information processing terminal 1 itself from the operating system, and receive only the password input. Alternatively, if the information processing terminal 1 is equipped with a camera, the information processing terminal 1 may be configured to read a QR Code® containing the SSID and the password of the access point with the camera, and acquire the connection information from the read image.

In the embodiment, when there is an access point that is being connected, the access point is determined to be the access point to be set up in the access point determining process. However, it is not necessary to determine whether there is an access point which is being connected. In other words, processes S302 and S303 of the access point determining process can be omitted. Further, in the access point determining process, when there is an access point that is currently connected, the access point is determined to be set up without receiving the user's selection, but the user's selection may be received. For example, the connection information of the access point that is currently connected may be highlighted and the user's selection may be received.

When there are multiple access points within a particular range, the CPU 11 may highlight the access points that are frequently used. The information processing terminal 1 may, for example, store the information in the connection information DB 122 when an access point is connected to by various applications running on the information processing terminal 1, and may determine an access point that has been connected more often than a particular number of times as a frequently used access point.

In the above-described embodiment, in the selection setting process, the CPU 11 is configured to start the communication with the electronic device 2 according to the NFC method after the connection information is determined. However, the order may be reversed. That is, once the information processing terminal 1 receives the device setup instruction, the information processing terminal 1 may prompt the user to communicate with the target electronic device 2 according to the NFC method to start the communication according to the WFD method, and then receive the selection of the connection information to be transmitted afterward. Alternatively, the information processing terminal 1 may be configured to disconnect the connection once without starting the WFD communication after confirming establishment of the connection according to the NFC method, receive the user selection of the connection information, and then restore the communication again. Further alternatively, the information processing terminal 1 may be configured to transmit the selected connection information according to the NFC communication.

In the above-described embodiment, the information processing terminal 1 is configured to communicate with the electronic device 2 according to the NFC method. However, the information processing terminal may be configured to communicate with the electronic device 2 according to other short-range wireless communication methods such as Bluetooth.

In the embodiment, it is assumed that the electronic device 2 is a device that has not yet completed the setup to connect to the access point 4. However, the electronic device 2 may be a device in which the setup has already been completed. In such a case, the electronic device 2 may be set up again based on the connection information received from the information processing terminal 1. For example, when the electronic device 2 receives the connection information for the access point 4 while the electronic device 2 has completed the setup to connect with an access point different from the access point 4, the electronic device 2 completes the setup to connect with the access point 4. In this case, the electronic device 2 may delete the connection information of the other access points and store only the connection information of the access point 4.

Although the position information obtaining unit 15 equipped with the GPS function is illustrated in the embodiment, the position information obtaining unit 15 may be configured to include a beacon receiver. For example, when used in a building in which multiple beacon transmitters are located, information indicating a current position may be obtained based on the information of the beacons received by the position information obtaining unit 15. The position information obtaining unit 15 may also be configured to receive user input as the position information. For example, the position information obtaining unit 14 may be configured to receive information indicating the number of floors of the building or a particular section on a floor as information indicating the current position.

It is noted that the position information obtaining unit 15 may be configured to obtain the SSID of the access point to which the information processing terminal 1 is connected as the position information. For example, the SSID of the access point, to which the information processing terminal 1 is connected when the user enters the connection information, is stored in the connection information DB 122 as the position information. Then, in the access point determining process, the connection information, which is associated with the SSID coinciding with the SSID of the access point to which the information processing terminal 1 is currently connected as the position information, may be retrieved from the connection information DB 122. Since the wireless communication through the access point has a limited communication range, the position of the information processing terminal 1 can be estimated based on the information of the access point to which the information processing terminal 1 is connected. Therefore, the SSID of the access point can be used as the position information.

It is noted that, in the sequence diagrams and flowcharts disclosed in the embodiments, multiple processes in any of multiple steps can be arbitrarily changed in the order of execution, or executed in parallel, unless there is no inconsistency in the processing contents.

The processes disclosed in the embodiment may be executed in hardware such as a single CPU, multiple CPUs, ASICs, etc., or a combination thereof. Further, the processes disclosed in the embodiment may also be realized in various forms, such as a recording medium storing computer-executable instructions causing, when executed by, for example, a computer, the information processing terminal to execute the processes, or a method.

What is claimed is:

1. A non-transitory computer-readable recording medium for an information processing terminal having a controller, the recording medium containing computer-executable instructions which cause, when executed by the controller, the information processing terminal to perform:

an obtaining process of obtaining connection information to be used for a setup to connect to an access point of a wireless network according to a first communication method;

a storing process of storing the connection information obtained in the obtaining process in a storage of the information processing terminal;

a selecting process of selecting particular connection information which is a connection information of an access point satisfying a particular condition from at least one piece of the connection information stored in the storage, the particular connection information being selected based on information obtained by the information processing terminal;

a connecting process of connecting to an electronic device according to a second communication method; and a transmitting process of transmitting the particular connection information selected in the selecting process to the electronic device connected to in the connecting process, wherein the electronic device is configured to complete the setup using the particular connection information transmitted by the information processing terminal in the transmitting process and received from the information processing terminal, wherein the information processing terminal has a function of obtaining position information indicating a position of the information processing terminal, wherein, the instructions further cause, when executed by the controller, the information processing terminal to:
in the storing process, store the connection information in the storage in association with the position information, and
in the selecting process, when a position indicated by the position information is within a particular range, determining that the connection information associated with the position information satisfies the particular condition.

2. The non-transitory computer-readable recording medium according to claim 1,
wherein the connection information includes identification information identifying an access point,
wherein, the instructions further cause, when executed by the controller, the information processing terminal to, in the selecting process:
obtain the identification information of the access point to be connected to the information processing terminal; and
select connection information including the identification information of the access point to be connected to the information processing terminal connects, from at least one piece of the connection information stored in the storage, as the particular connection information.

3. The non-transitory computer-readable recording medium according to claim 2,
wherein the position information is geographic position information,
wherein, the instructions further cause, when executed by the controller, the information processing terminal to:
in the obtaining process, obtain first position information indicating a first geographic position of the information processing terminal when obtaining the connection information;
in the storing process, storing the connection information in the storage in association with the first position information obtained when the connection information is obtained as the position information; and
in the selecting process, when the at least one piece of the connection information stored in the storage does not include the connection information including the identification information of the access point to be connected to the information processing terminal:
obtaining second position information indicating a second geographic position of a current position of the information processing terminal; and
wherein, in the selecting process, a distance between the obtained second position information and the stored position information of each of the at least one piece of connection information is determined and compared with the particular range; and
wherein the one piece of connection information is selected based on the determination.

4. The non-transitory computer-readable recording medium according to claim 1,
wherein the position information is geographical position information,
wherein, the instructions further cause, when executed by the controller, the information processing terminal to:
in the obtaining process, obtain first position information indicating a position of the information processing terminal when obtaining the connection information,
in the storing process, store the connection information in the storage in association with the first position information which has been obtained when obtaining the connection information as the position information, and
in the selecting process:
obtain second position information indicating a geographic position of a current position of the information processing terminal; and
wherein, in the selecting process, a distance between the obtained second position information and the stored position information of each of the at least one piece of connection information is determined and compared with the particular range; and
wherein the one piece of connection information is selected based on the determination.

5. The non-transitory computer-readable recording medium according to claim 1,
wherein the position information is geographic position information,
wherein, the instructions further cause, when executed by the controller, the information processing terminal to:
in the obtaining process, obtain first position information indicating a position of the information processing terminal when obtaining the connection information,
in the storing process, store the connection information in the storage in association with the first position information which has been obtained when obtaining the connection information as the position information, and
in the selecting process:
obtain second position information indicating a current geographical position of the information processing terminal;
when selecting the particular connection information, display the connection information stored in the storage on a display device of the information processing terminal in a list;
receive a selection operation for one piece of the connection information displayed in the list;
select the connection information for which the selection operation was received as the particular connection information; and displaying multiple pieces of the connection information in the list such that the connection information associated with the first position information indicating a closer position to the current geographical position of the information processing terminal indicated by the second position information is displayed in a more prioritized manner.

6. The non-transitory computer-readable recording medium according to claim 1,
wherein the instructions further cause, when executed by the controller, the information processing terminal to perform:
when the particular connection information has not been selected in the selecting process, a notifying process of notifying that there exists no access point that satisfies the particular condition.

7. The non-transitory computer-readable recording medium according to claim 1,
wherein the connection information includes authentication information to be used for the setup,
wherein, when receiving, from the electronic device, a notification indicating that the setup using the particular connection information, which is transmitted in the transmitting process, is failed, the instructions further cause, when executed by the controller, the information processing terminal to perform:
receiving an input of new authentication information; and
executing a retransmitting process of transmitting the received new authentication information to the electronic device,
wherein the electronic device is configured to complete the setup using the new authentication information received, in the retransmitting process, from the information processing terminal.

8. The non-transitory computer-readable recording medium according to claim 7,
wherein, when receiving, from the electronic device, a notification indicating the setup using the particular connection information transmitted in the transmitting process has successfully completed, the instructions further cause, when executed by the controller, the information processing terminal to perform a changing process of changing the authentication information of the connection information, which is subjected to transmission in the transmitting process, from among the connection information stored in the storage to the new authentication information subjected to transmission in the retransmitting process.

9. The non-transitory computer-readable recording medium according to claim 1,
wherein the storage is configured to store the connection information input by other computer-executable instructions different from the computer-executable instructions, and
wherein the computer-executable instructions further cause, when executed by the controller, the information processing terminal to select particular connection information which is the connection information of an access point satisfying the particular condition from among the connection information stored in the storage containing the connection information input by the other computer-executable instructions.

10. An information processing terminal comprising:
a storage; and
a controller,
the controller being configured to perform:
an obtaining process of obtaining connection information to be used for a setup to connect to an access point of a wireless network according to a first communication method;
a storing process of storing the connection information obtained in the obtaining process in a storage of the information processing terminal;
a selecting process of selecting particular connection information which is a connection information of an access point satisfying a particular condition from at least one piece of the connection information stored in the storage, the particular connection information being selected based on information obtained by the information processing terminal;
a connecting process of connecting to an electronic device according to a second communication method; and
a transmitting process of transmitting the particular connection information selected in the selecting process to the electronic device connected to in the connecting process,
wherein the electronic device is configured to complete the setup using the particular connection information transmitted by the information processing terminal in the transmitting process and received from the information processing terminal,
wherein the information processing terminal is further configured to obtain position information indicating a position of the information processing terminal and store in the storage the obtained position information in association with the connection information obtained, and
wherein when the position indicated by the position information is within a particular range, the information processing terminal is configured to determine that the connection information associated with the position information satisfies the particular condition.

11. A method of controlling an information processing terminal, comprising:
obtaining connection information to be used for a setup to connect to an access point of a wireless network according to a first communication method;
obtaining position information indicating a position of the information processing terminal;
storing the obtained connection information in association with the obtained position information in a storage of the information processing terminal;
selecting particular connection information which is a connection information of an access point satisfying a particular condition from at least one piece of the connection information stored in the storage of the information processing terminal, the particular connection information being selected based on information obtained by the information processing terminal, and wherein, in the selecting, determining that the connection information associated with the position information satisfies the particular condition when the position indicated by the position information is within a particular range;
connecting to an electronic device according to a second communication method; and
transmitting the particular connection information selected in the selecting to the electronic device connected to in the connecting process, wherein the electronic device is configured to complete the setup using the particular connection information transmitted by the information processing terminal in the transmitting and received from the information processing terminal.

* * * * *